(12) United States Patent
Jang et al.

(10) Patent No.: US 11,399,372 B2
(45) Date of Patent: Jul. 26, 2022

(54) ELECTRONIC DEVICE PROVIDING PERIODIC POSITIONING COMMUNICATION VIA WIRELESS COMMUNICATION CHANNEL

(71) Applicant: Samsung Electronics Co., Ltd., Gyeonggi-do (KR)

(72) Inventors: Jonghoon Jang, Gyeonggi-do (KR); Doosuk Kang, Gyeonggi-do (KR); Hyunchul Kim, Gyeonggi-do (KR); Yi Yang, Gyeonggi-do (KR); Sejong Yoon, Gyeonggi-do (KR); Moonseok Kang, Gyeonggi-do (KR); Eunji Kwon, Gyeonggi-do (KR); Myeonghwan Nam, Gyeonggi-do (KR)

(73) Assignee: Samsung Electronics Co., Ltd

( * ) Notice: Subject to any disclaimer, the term of this patent is extended or adjusted under 35 U.S.C. 154(b) by 116 days.

(21) Appl. No.: 16/721,276

(22) Filed: Dec. 19, 2019

(65) Prior Publication Data

US 2020/0305142 A1 Sep. 24, 2020

(30) Foreign Application Priority Data

Mar. 19, 2019 (KR) .................. 10-2019-0031406

(51) Int. Cl.
*H04W 72/04* (2009.01)
*G01S 13/76* (2006.01)
(Continued)

(52) U.S. Cl.
CPC ........... *H04W 72/048* (2013.01); *G01S 13/76* (2013.01); *H04M 1/72412* (2021.01);
(Continued)

(58) Field of Classification Search
CPC ....... H04W 4/023; H04W 4/80; H04W 4/027; H04W 4/029; H04W 4/02; H04W 72/048;
(Continued)

(56) References Cited

U.S. PATENT DOCUMENTS 10,477,344 B1* 11/2019 Silver ................. H04L 43/0852
10,849,079 B2* 11/2020 Khati .................. H04W 52/246
(Continued)

FOREIGN PATENT DOCUMENTS

JP 2007-278731 10/2007
JP 2010-136216 6/2010
(Continued)

OTHER PUBLICATIONS

International Search Report dated Mar. 2, 2020 issued in counterpart application No. PCT/KR2019/015828, 3 pages.
(Continued)

*Primary Examiner* — Allahyar Kasraian
(74) *Attorney, Agent, or Firm* — The Farrell Law Firm, P.C.

(57) ABSTRACT

An electronic device is provided. The electronic device includes an ultra-wideband (UWB) communication circuit, a processor operatively connected to the UWB communication circuit, and a memory operatively connected to the processor. The memory stores instructions, and when the instructions are executed, the instructions, when executed, further cause the processor to establish a wireless communication channel with an external electronic device using the UWB communication circuit, perform positioning communication with the external electronic device based on a predetermined period, via the wireless communication channel, recognize a distance between the electronic device and the external electronic device, and a changing trend of the distance, based at least on the positioning communication,
(Continued)

and change the positioning communication period based on the recognized distance and the changing trend.

19 Claims, 13 Drawing Sheets

(51) Int. Cl.
*H04W 4/02* (2018.01)
*H04W 52/02* (2009.01)
*H04M 1/72412* (2021.01)

(52) U.S. Cl.
CPC ........... *H04W 4/023* (2013.01); *H04W 4/027* (2013.01); *H04W 52/0238* (2013.01)

(58) Field of Classification Search
CPC ............. H04W 76/14; H04W 52/0245; H04W 52/0238; H04M 1/72412; H04M 1/72457; H04M 2250/12; H04M 2203/2094; G01S 13/74; G01S 13/825
See application file for complete search history.

(56) References Cited

U.S. PATENT DOCUMENTS

| | | | |
|---|---|---|---|
| 2009/0187678 A1* | 7/2009 | Itoh | H04W 4/025 710/20 |
| 2010/0144273 A1 | 6/2010 | Sekkawa et al. | |
| 2012/0119948 A1 | 5/2012 | Tsuda | |
| 2012/0124400 A1 | 5/2012 | Yoon | |
| 2016/0158625 A1 | 6/2016 | DeAngelis et al. | |
| 2018/0020422 A1 | 1/2018 | Ichikawa et al. | |
| 2018/0192460 A1* | 7/2018 | Huh | H04W 76/23 |
| 2018/0249409 A1 | 8/2018 | Cho et al. | |
| 2019/0061689 A1* | 2/2019 | Breer | B60R 25/245 |
| 2019/0168712 A1* | 6/2019 | Yakovenko | B60R 25/01 |
| 2019/0297462 A1 | 9/2019 | Aljadeff | |

FOREIGN PATENT DOCUMENTS

| | | |
|---|---|---|
| JP | 2016109487 | 6/2016 |
| KR | 1020070047628 | 5/2007 |
| KR | 10-1588800 | 1/2016 |
| KR | 1020180083570 | 7/2018 |
| KR | 1020180098051 | 9/2018 |
| WO | WO 2018/011792 | 1/2018 |

OTHER PUBLICATIONS

European Search Report dated Jan. 20, 2022 issued in counterpart application No. 19919939.9, 10 pages.

* cited by examiner

FIG. 7A
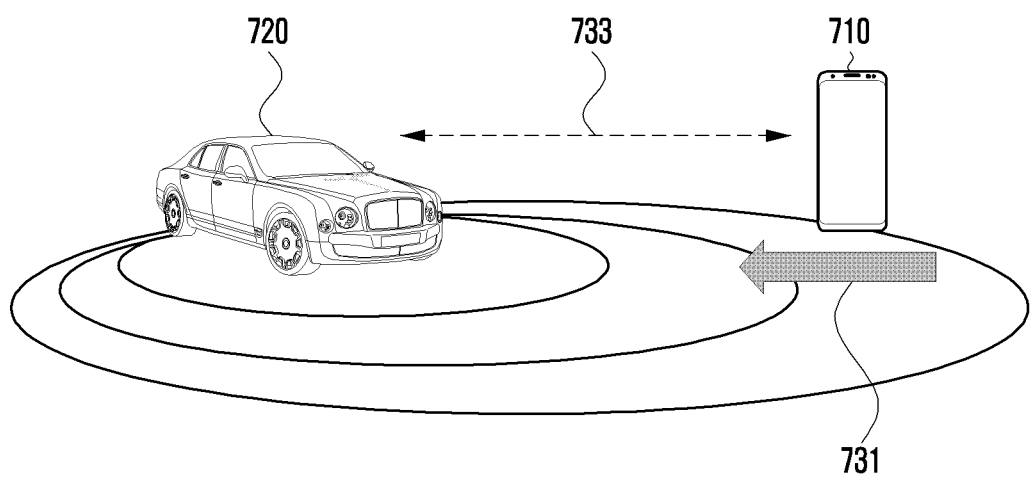
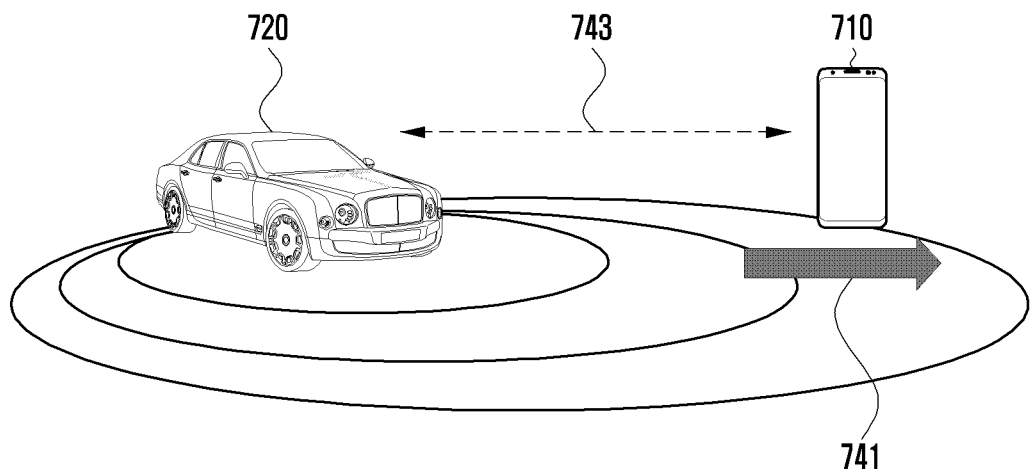

FIG. 7B
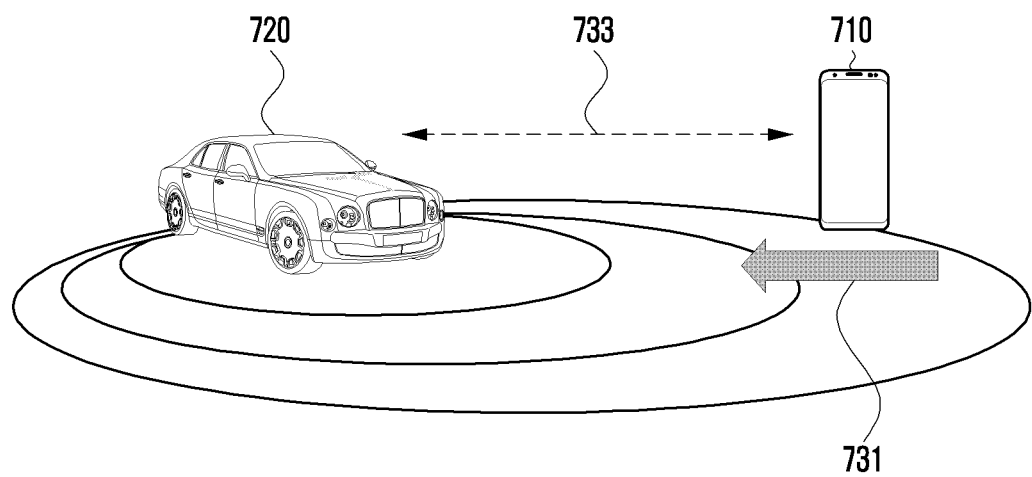
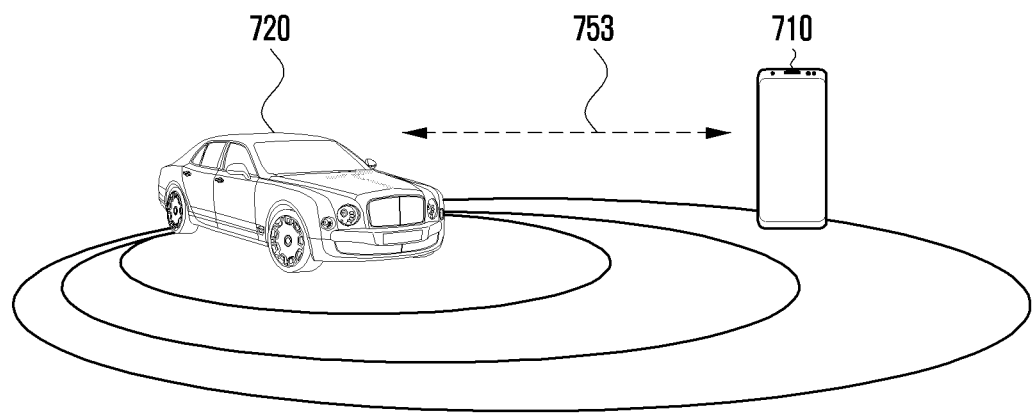

FIG. 7C
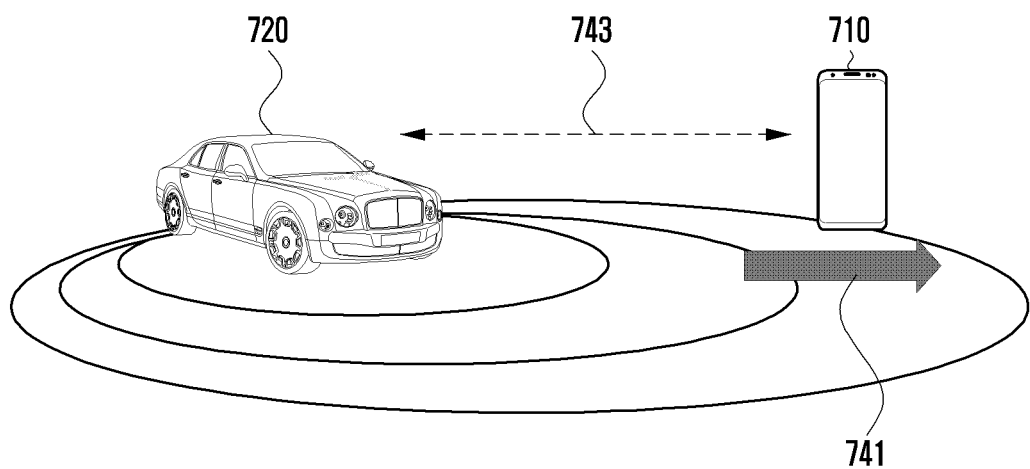
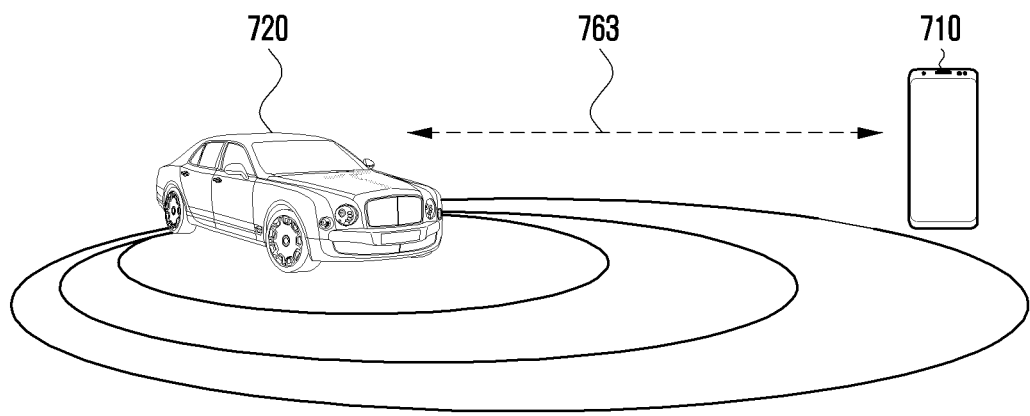

ELECTRONIC DEVICE PROVIDING PERIODIC POSITIONING COMMUNICATION VIA WIRELESS COMMUNICATION CHANNEL

CROSS-REFERENCE TO RELATED APPLICATION(S)

This application is based on and claims priority under 35 U.S.C. 119 from Korean Patent Application Serial No. 10-2019-0031406, filed on Mar. 19, 2019, in the Korean Intellectual Property Office, the entire disclosure of which is incorporated herein by reference.

BACKGROUND

1. Field

The present disclosure relates generally to an electronic device that provides positioning based on wireless communication.

2. Description of Related Art

An electronic device may perform a predetermined function based on the distance to an external electronic device. The electronic device may measure the distance between the electronic device and the external electronic device via wireless communication. For example, the electronic device periodically wakes up and transmits, to the external electronic device, a positioning signal (e.g., a beacon) for measuring a distance. The external electronic device may always stay awake or may periodically wake up, so as to receive a positioning signal and to respond to the signal.

An electronic device may perform positioning communication based on a predetermined period. For example, the positioning communication may be performed periodically until a wireless communication channel (or session) is terminated. Also, the electronic device may periodically transmit a positioning signal even though an external electronic device capable of serving as a counterpart of the positioning communication is not present around the electronic device. Therefore, current may be consumed unnecessarily and/or positioning performance may deteriorate. If the distance between the electronic device and the external device decreases quickly when the electronic device performs positioning communication based on a designated period, update of the measured distance may be delayed and the latency of data may increase, and thus positioning accuracy may deteriorate.

SUMMARY

The present disclosure has been made to address at least the disadvantages described above and to provide at least the advantages described below.

According to an aspect, an electronic device according to an embodiment may dynamically control a positioning communication period based on the distance to the external electronic device and a changing trend of the distance, and thus may reduce the amount of current consumed and increase positioning accuracy.

According to an aspect, an electronic device according to an embodiment may use Bluetooth Low Energy (BLE) communication, which consumes a small amount of power and has a long recognition distance, as a trigger for activating positioning communication (e.g., ultra-wideband (UWB) communication), and may reduce the amount of current consumed.

In accordance with an aspect of the disclosure, an electronic device is provided and includes a first wireless communication circuit, a second wireless communication circuit which uses a communication scheme different from the first wireless communication circuit, a processor operatively connected to the first wireless communication circuit and the second wireless communication circuit, and a memory operatively connected to the processor. The memory stores instructions, and when the instructions are executed, the instructions cause the processor to establish a first wireless communication channel with an external electronic device using the first wireless communication circuit, transmit session information to the external electronic device via the first wireless communication channel, establish a second wireless communication channel with the external electronic device using the second wireless communication circuit, based on at least a part of the session information, perform positioning communication with the external electronic device based on a predetermined first period via the second wireless communication channel, recognize a distance between the electronic device and the external electronic device and a changing trend of the distance based at least on the positioning communication, and change the positioning communication period based on the recognized distance and changing trend.

In accordance with an aspect of the disclosure, an electronic device is provided. The electronic device includes a UWB communication circuit, a processor operatively connected to the UWB communication circuit, and a memory operatively connected to the processor. The memory stores instructions, and when the instructions are executed, the instructions, when executed, further cause the processor to establish a wireless communication channel with an external electronic device using the UWB communication circuit, perform positioning communication with the external electronic device based on a predetermined period, via the wireless communication channel, recognize a distance between the electronic device and the external electronic device, and a changing trend of the distance, based at least on the positioning communication, and change the positioning communication period based on the recognized distance and the changing trend.

In accordance with an aspect of the disclosure, a method of operating an electronic device is provided. The method includes establishing a first wireless communication channel with an external electronic device using a first wireless communication circuit of the electronic device, transmitting session information to the external electronic device via the first wireless communication channel, establishing a second wireless communication channel with the external electronic device using a second wireless communication circuit of the electronic device based on at least a part of the session information, performing positioning communication with the external electronic device based on a predetermined first period via the second wireless communication channel, recognizing a distance between the electronic device and the external electronic device and a changing trend of the distance, based at least on the positioning communication, and changing the positioning communication period, based on the recognized distance and the changing trend.

BRIEF DESCRIPTION OF THE DRAWINGS

The above and other aspects, features and advantages of certain embodiments of the disclosure will be more apparent from the following detailed description taken in conjunction with the accompanying drawings, in which:

FIG. 7A is a diagram of a dynamic change in a positioning communication period according to a changing trend of the distance between a user equipment and a vehicle, according to an embodiment;

FIG. 7B is a diagram of a dynamic change in a positioning communication period according to a changing trend of the distance between a user equipment and a vehicle, according to an embodiment;

FIG. 7C is a diagram of a dynamic change in a positioning communication period according to a changing trend of the distance between a user equipment and a vehicle, according to an embodiment;

DETAILED DESCRIPTION

Figure 1:
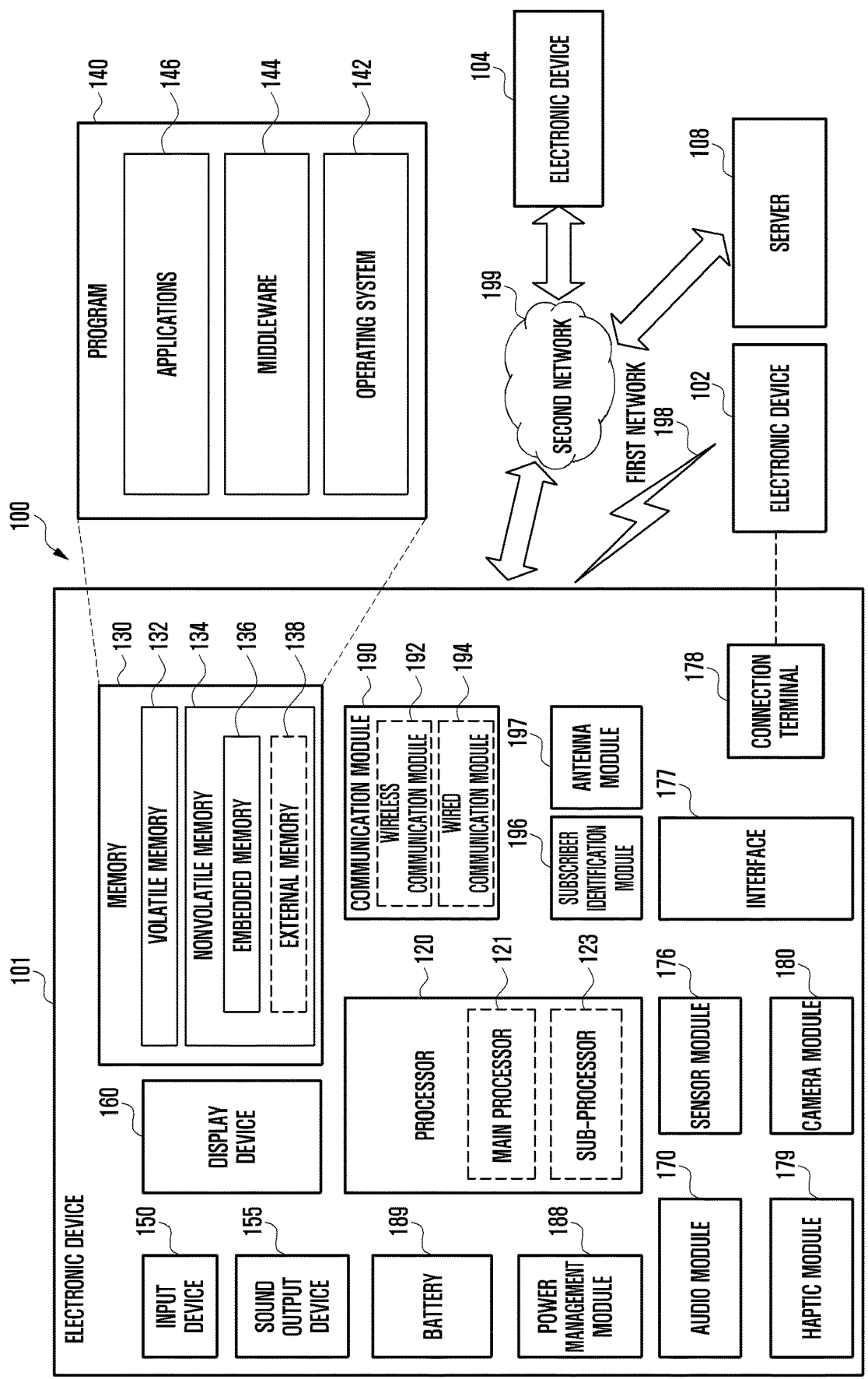
FIG. 1 is a diagram of an electronic device within a network environment, according to an embodiment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, ISPs, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, BLE (Bluetooth low energy), UWB (ultra wide band), or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
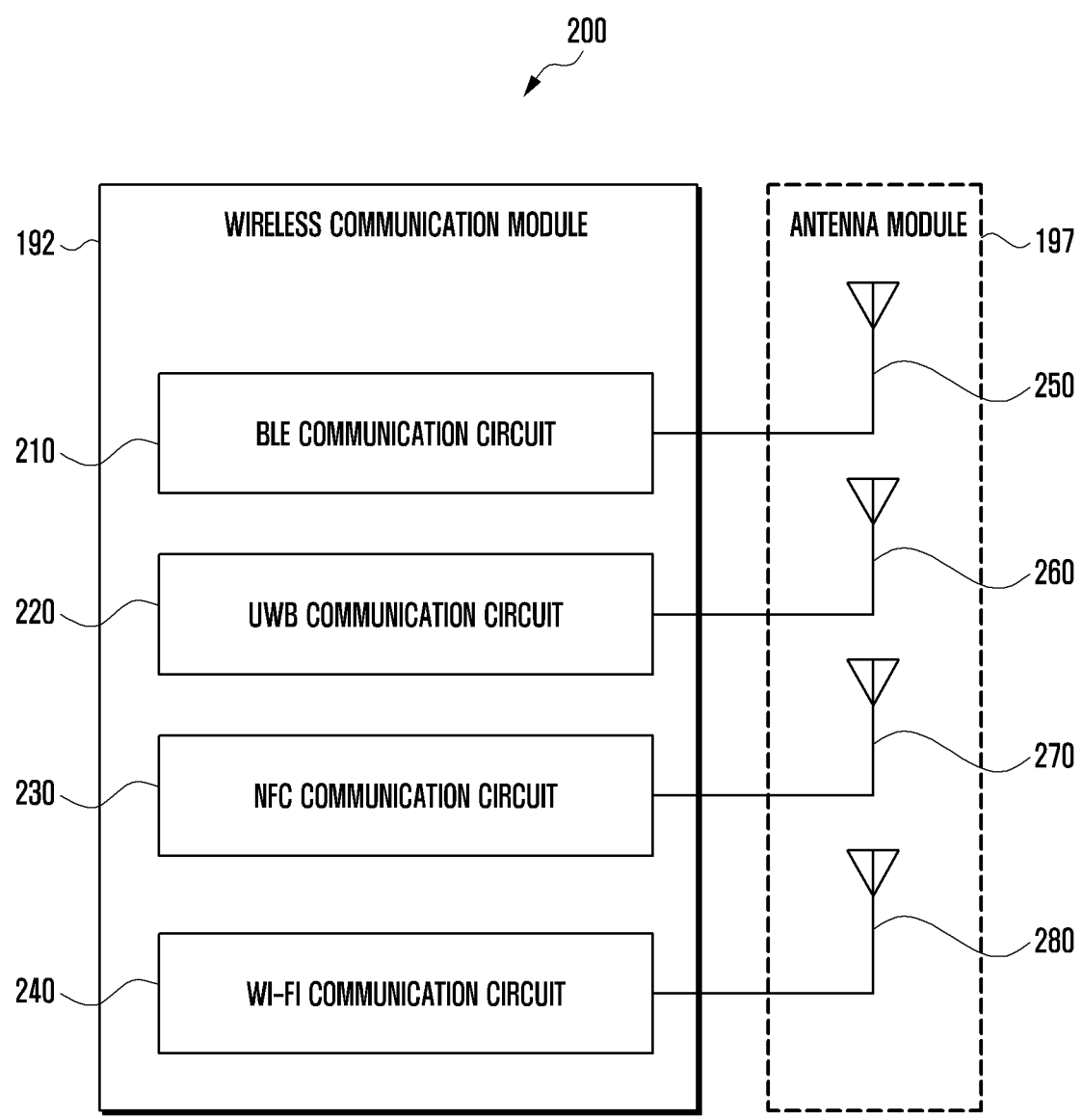
FIG. 2 is a diagram of a wireless communication module and an antenna module of an electronic device, according to an embodiment.

FIG. 2 is a diagram 200 of the wireless communication module 192 and the antenna module 197 of the electronic device 101, according to an embodiment. Referring to FIG. 2, the wireless communication module 192 may include a BLE communication circuit 210, a UWB communication circuit 220, a near field communication (NFC) communication circuit 230, or a Wi-Fi communication circuit 240. In this instance, the antenna module 197 may include a plurality of antennas, including a BLE antenna 250 connected to the BLE communication circuit 210, a UWB antenna 260 connected to the UWB communication circuit 220, an NFC antenna 270 connected to the NFC communication circuit 230, and a Wi-Fi antenna 280 connected to the Wi-Fi communication circuit 240. The function of at least one of the BLE communication circuit 210, the UWB communication circuit 220, the NFC communication circuit 230, or the Wi-Fi communication circuit 240 may be controlled by the processor 120 (e.g., an AP and/or CP).

The BLE communication circuit 210 may support establishment of a BLE communication channel (or BLE session) corresponding to a predetermined frequency band to be used for BLE communication from among bands to be used for wireless communication with an external electronic device (e.g., the external electronic device 102 of FIG. 1). The BLE communication circuit 210 may support BLE communication with the external electronic device via the BLE communication channel. In the case of transmission, the BLE communication circuit 210 may convert a baseband signal, which is generated by the processor 120 (e.g., an AP and/or CP) and is received from the processor 120, into an RF signal of the BLE band, and may transmit the converted signal to the outside via the BLE antenna 250. In the case of reception, the BLE communication circuit 210 may obtain an RF signal of the BLE band (e.g., approximately 2.4 GHz) via the BLE antenna 250, may convert the obtained RF signal into a signal of a base band (e.g., less than or equal to several MHz), and may transmit the same to the processor 120.

The UWB communication circuit 220 may support establishment of a UWB communication channel (or UWB session) corresponding to a predetermined frequency band (e.g., approximately 3.1 to 10.6 GHz) to be used for UWB communication from among bands to be used for wireless communication with an external electronic device (e.g., the external electronic device 102 of FIG. 1). The UWB communication circuit 220 may support UWB communication with the external electronic device via the UWB communication channel. In the case of transmission, the UWB communication circuit 220 may convert a baseband signal, which is generated by the processor 120 (e.g., an AP and/or a CP) and is received from the processor 120, into an RF signal of the UWB band, and may transmit the converted signal to the outside via the UWB antenna 260. In the case of reception, the UWB communication circuit 220 may obtain an RF signal of the UWB band, may convert the obtained RF signal into a baseband signal, and may transmit the converted signal to the processor 120. The wireless communication module 192 may further include a filter (e.g., a UWB band pass filter) that enables the portion of the RF signal in the UWB band to pass, among the entire RF signal received from the UWB antenna 260, and may transmit the same to the UWB communication circuit 220. Although not illustrated, the UWB antenna 260 may include a plurality of antennas. For example, the UWB antenna 260 may include a first antenna for RF signal transmission or reception and a second antenna dedicated to RF signal reception.

The NFC communication circuit 230 may support establishment of an NFC communication channel (or NFC session) corresponding to a predetermined frequency band (e.g., approximately 13.56 MHz) to be used for NFC communication from among bands to be used for wireless communication with an external electronic device (e.g., the external electronic device 102 of FIG. 1). The NFC communication circuit 230 may support NFC communication with the external electronic device via the NFC communication channel. In the case of transmission, the NFC communication circuit 230 may convert a baseband signal, which is generated by the processor 120 (e.g., an AP and/or CP) and is received from the processor 120, into an RF signal in the NFC band, and may transmit the converted signal to the outside via the NFC antenna 270. In the case of reception, the NFC communication circuit 230 may obtain an RF signal in the NFC band via the NFC antenna 270, may convert the obtained RF signal into a baseband signal, and may transmit the converted signal to the processor 120.

The Wi-Fi communication circuit 240 may support establishment of a Wi-Fi communication channel (or Wi-Fi session) corresponding to a predetermined frequency band to be used for Wi-Fi communication from among bands to be used for wireless communication with an external electronic device (e.g., the external electronic device 102 of FIG. 1). The Wi-Fi communication circuit 240 may support Wi-Fi communication with the external electronic device via the Wi-Fi communication channel. In the case of transmission, the Wi-Fi communication circuit 240 may convert a baseband signal, which is generated by the processor 120 (e.g., an AP and/or CP) and is received from the processor 120, into an RF signal of the Wi-Fi band, and may transmit the converted signal to the outside via the Wi-Fi antenna 280. In the case of reception, the Wi-Fi communication circuit 240 may obtain an RF signal of the Wi-Fi band via the Wi-Fi antenna 280, may convert the obtained RF signal into a baseband signal, and may transmit the converted signal to the processor 120.

The processor 120 may perform communication for positioning (e.g., measuring a distance) with the external electronic device 120 via a wireless communication channel, and may recognize the distance between the electronic device 101 and the external electronic device 102 and a changing trend in the distance based at least on the positioning communication. The changing trend may include information indicating whether variation in the distance exists, and information indicating whether the distance is to increase or decrease if variation in the distance exists. Also, the changing trend may further include information indicating a speed of a decrease (or increase) when the distance decreases or increases and/or variation in the speed per unit time (acceleration).

The processor 120 may calculate a variation in the distance per unit time using a plurality of distance values obtained by performing periodic positioning communication. The processor 120 may recognize a changing trend in the distance from the calculated variation. If the variation (e.g., a current distance value–a previous distance value) is a negative value, the processor 120 may determine that the distance between the external electronic device 102 and the electronic device 101 tends to decrease. If the variation is a positive value, the processor 120 may determine that the distance between the external electronic device 102 and the electronic device 101 tends to increase. The processor 120 may recognize a speed and/or an acceleration when the distance between the electronic device 101 and the external electronic device 102 decreases or increases, based on the calculated variation.

The processor 120 may recognize a movement state (e.g., calculate a speed or an acceleration) of the electronic device 102, based on a signal received from the sensor module 176 (e.g., an acceleration sensor). The processor 120 may recognize a changing trend based on the variation and the moving state. The processor 120 may calculate the speed or acceleration of the electronic device 102 using the signal received from the sensor module 176 when the distance between the electronic device 101 and the external electronic device 102 decreases or increases.

The processor 120 may recognize a changing trend based on variation in the strength (e.g., received signal strength indicator (RSSI)) of a signal received from the external electronic device 102 and the movement state (e.g., a movement direction). The processor 120 may determine a first movement direction, recognized when the strength tends to increase, as the direction in which the electronic device 101 moves close to the external electronic device 102. The processor 120 may determine a second movement direction (a direction opposite to the first movement direction), recognized when the strength tends to decrease, as the direction in which the electronic device 101 moves distant from the external electronic device 102. The processor 120 may calculate the speed or acceleration of the electronic device 102 using a signal received from the sensor module 176 when the distance between the electronic device 101 and the external electronic device 102 decreases or increases.

The processor 120 may change a positioning communication period based at least on a distance and/or a changing trend.

Figure 3:
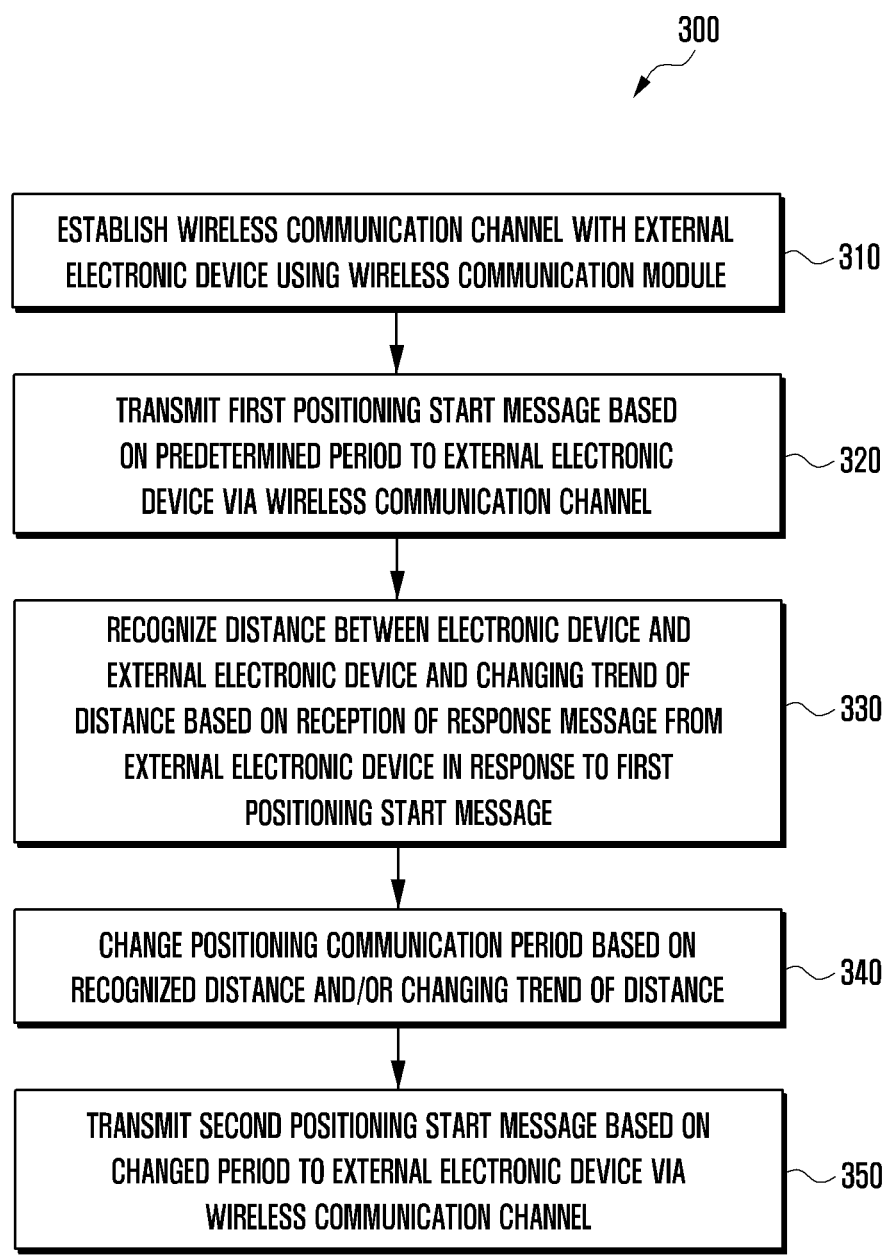
FIG. 3 is a flowchart of steps for positioning by a processor, according to an embodiment.

FIG. 3 is a flowchart 300 of steps for positioning by the processor 120, according to an embodiment.

At step 310, the processor 120 of the electronic device 101 may establish a wireless communication channel with the external electronic device 102 using the wireless communication module 197 in order to activate positioning communication. The positioning communication may include a step of dynamically controlling a positioning communication period based at least on the distance between the electronic device 101 and the external electronic device 102 and a changing trend in the distance.

The processor 120 may establish a UWB communication channel with the external electronic device 102 using the UWB communication circuit 220. Based on the fact that the UWB communication circuit 220 is switched from a disabled state (e.g., a sleep state or a turned-off state) to an enabled state, the processor 120 may establish a UWB communication channel with the external electronic device 102 using the UWB communication circuit 220, and may perform positioning communication with the external electronic device 102 via the established UWB communication channel.

In the case of BLE, positioning accuracy is lower than other short-range communication technologies (e.g., UWB). However, power consumption is low and a recognition distance (a distance in which the electronic device is capable of recognizing the existence of an external electronic device near the electronic device) is long. Accordingly, BLE may be used as a trigger for activating positioning communication.

The processor 120 may receive a signal (e.g., an advertising or broadcasting packet) for connection to the external electronic device 102 from the external electronic device 102 via the BLE communication circuit 210. The external electronic device 102 may transmit a signal as an advertiser (or a broadcaster), and the electronic device 101 may periodically scan a signal as an observer. If the strength (e.g., RSSI) of a received signal is greater than a predetermined threshold value, the processor 120 may determine to activate positioning communication using UWB communication. According to the determination, the processor 120 may establish a UWB communication channel with the external electronic device 102 using the UWB communication circuit 220. If the UWB communication circuit 220 is in the disabled state, the processor 120 may convert the UWB communication circuit 220 to the enabled state according to the determination, may establish a UWB communication channel with the external electronic device 102 using the UWB communication circuit 220, and may perform positioning communication with the external electronic device 102 via the established UWB communication channel.

The processor 120 may monitor variation in the strength (e.g., RSSI) of a signal (e.g., advertising or broadcasting packet) received via the BLE communication circuit 210. The processor 120 may recognize a changing trend in the strength based on monitoring. If it is recognized that the strength tends to increase, the processor 120 may determine to activate positioning communication using UWB communication. The processor 120 may establish a UWB communication channel with the external electronic device 102 using the UWB communication circuit 220 based on the determination, and may perform positioning communication with the external electronic device 102 via the established UWB communication channel.

The processor 120 may establish a BLE communication channel with the external electronic device 102 using the BLE communication circuit 210. The processor 120 may exchange UWB session information (e.g., a wireless communication channel, a session ID, or a data rate) with the external electronic device 102 via the established BLE communication channel. Additionally, the processor 120 may exchange information associated with a positioning communication scheme (e.g., a positioning communication period, a single-side (SS) two-way ranging (TWR), or a double-side (DS) TWR) with the external electronic device 102 via the established BLE communication channel. The processor 120 may establish a UWB communication channel with the external electronic device 102 using the UWB communication circuit 220, based on the exchanged UWB session information, and may perform positioning communication with the external electronic device 102 via the established UWB communication channel.

The processor 120 may establish a BLE communication channel with the external electronic device 102 using the BLE communication circuit 210. The processor 120 may determine to activate the positioning communication using UWB communication based on the strength of a signal received from the external electronic device 102 via the established BLE communication channel (e.g., if the strength is greater than a predetermined threshold value). The processor 120 may establish a UWB communication channel with the external electronic device 102 using the UWB communication circuit 220 based on the determination, and may perform positioning communication with the external electronic device 102 via the established UWB communication channel.

The processor 120 may establish a BLE communication channel with the external electronic device 102 using the BLE communication circuit 210. The processor 120 may monitor variation in the strength of a signal received from the external electronic device 102 via the established BLE communication channel, and may determine to activate positioning communication using the UWB communication circuit 220 based on the monitoring (e.g., if the result of monitoring shows that the strength tends to increase). The processor 120 may establish a UWB communication channel with the external electronic device 102 using the UWB communication circuit 220 based on the determination, and may perform positioning communication with the external electronic device 102 via the established UWB communication channel.

The processor 120 may use the Wi-Fi communication circuit 240 as a trigger for activating positioning communication. The processor 120 performs a function of discovering (e.g., neighborhood-aware networking (NAN)) the external electronic device 102 existing around the electronic device using the Wi-Fi communication circuit 240, and may establish a Wi-Fi communication channel with the external electronic device 102. The processor 120 may exchange UWB session information with the external electronic device 102 via the established Wi-Fi communication channel. The processor 120 may establish a UWB communication channel with the external electronic device 102 using the UWB communication circuit 220, based on the exchanged UWB session information, and may perform positioning communication with the external electronic device 102 via the established UWB communication channel.

At step 320, the processor 120 may transmit a first positioning start message (e.g., poll message defined in IEEE 802.15.4) based on a predetermined period to the external electronic device via a wireless communication channel.

The period may be an initial value (or a default value) that the two devices 101 and 102 are aware of in advance of performing step 320.

The processor 120 may determine the positioning communication period based on the information exchanged with the external electronic device 102, before performing step 320.

While step 310 is being performed, the period may be determined by one of the two devices 101 and 102 and may be transferred to the other one thereof. The electronic device 101 scans a wireless communication channel (e.g., a BLE communication channel and/or a UWB communication channel) so as to recognize the existence of the external electronic device 102. Accordingly, the electronic device 101 may include period-related information in an information element (IE) of a header or a payload of a packet to be transferred to the external electronic device 102 in order to request establishment of a channel, and may transmit the same to the external electronic device 102 via the corresponding wireless communication circuit.

The period may be dynamically determined based on the strength of a signal (e.g., an advertising or broadcasting packet) received via the wireless communication channel (e.g., the BLE communication channel and/or UWB communication channel). For example, as the value of the strength is higher, the period may be set to be shorter.

At step 330, the processor 120 may recognize the distance between the electronic device and the external electronic device based on the reception of a response message from the external electronic device in response to the first positioning start message. The processor 120 may calculate the distance, based at least on a point in time at which the first positioning start message is transmitted, a point in time at which a response message is received, and time information included in the response message. The processor 120 may recognize a distance from information associated with a distance, which is calculated by the external electronic device 102 and is included in the response message.

At step 330, the processor 120 may additionally perform an step of recognizing a changing trend of the distance.

The processor 120 may recognize a changing trend of the distance based on the fact that the electronic device 101 satisfies a predetermined condition. The predetermined condition may be that a recognized distance is within a threshold value, a user input received by the processor 120 via an input device (e.g., a touch screen) is a user input for controlling the external electronic device 102 (e.g., for locking or unlocking a vehicle door), or an application that is running in the electronic device 101 is a designated application (e.g., an application for controlling a vehicle). If the electronic device 101 satisfies the predetermined condition, the processor 120 may determine a changing trend of the distance using a plurality of distance values obtained by performing periodic positioning communication. Additionally, the processor 120 may calculate the speed and/or acceleration of the electronic device 102 using the signal received from the sensor module 176 (e.g., an accelerations sensor) when the distance between the electronic device 101 and the external electronic device 102 decreases or increases.

At step 340, the processor 120 may change the positioning communication period based on the distance and/or the changing trend.

A range within a radius designated based on one of the two devices 101 and 102 is referred to as a first range, and a range outside the radius is referred to as a second range. In this instance, the radius may be the condition for changing a period. The processor 120 may maintain the positioning communication period as a first period if the recognized distance is greater than a threshold value (the radius), and may change the positioning communication period to a second period, which is shorter than the first period, if the recognized distance is within the threshold value. The processor 120 may maintain the positioning communication period as the first period if the recognized distance is within the threshold value, and may change the positioning communication period to a third period, which is longer than the first period, if the recognized distance is greater than the threshold value.

A table (e.g., Table 1 provided below) including the maximum radius, minimum radius, minimum period, and maximum period may be stored in the memory 130. The processor 120 may calculate the positioning communication period using the recognized distance and the table. At least one of the maximum radius, minimum radius, minimum period, and maximum period may be different for each application (e.g., apps A, B, and C in Table 1). The maximum radius, minimum radius, minimum period, and maximum period may not be different for each application (e.g., Apps C and D in Table 1), but may be the same.

TABLE 1

| App Name | Minimum radius (m) (minRadius) | Maximum radius (m) (maxRadius) | Minimum period (ms) (minPeriod) | Maximum period (ms) (maxPeriod) |
| --- | --- | --- | --- | --- |
| A | 10 | 100 | 1000 | 10000 |
| B | 50 | 20 | 2000 | 5000 |
| C | 100 | 10 | 1000 | 10000 |
| D | 100 | 10 | 1000 | 10000 |

After the processor 120 establishes a session (e.g., a BLE communication channel and/or UWB communication channel) with the external electronic device 102, an application 145 that is running in the electronic device 101 may set period information (e.g., at least one of the maximum radius, minimum radius, minimum period, and maximum period) using distance information and sensor information (e.g., an acceleration value). The set period information may be transferred to a service framework (e.g., the middle ware 144 of FIG. 1). The service framework may configure Table 1 using period information received from each of the running applications, and may store the same in the memory 120. An application may update a table using an application programming interface (API) (e.g., SetRangingPeriod( );). The processor 120 may access the memory 120, and may use the table when calculating a period. The processor 120 may transmit the information associated with the table to the external electronic device 102 via the communication channel. The table may be included in the header or the payload of a packet, and may be transmitted to the external electronic device 102.

The processor 120 may calculate a positioning communication period using Equation (1) provided below. The period to be calculated may be a period corresponding to a running application (e.g., a foreground application or a background application). The foreground application may indicate an application, the execution screen of which is currently displayed on a display, among the running applications. The background application is an application, the execution screen of which is not displayed on a display even though the application is running.

$$\text{period} = \frac{\text{distance}}{(maxRadius - minRadius) * (maxPeriod - minPeriod)} \quad (1)$$

A value (A) indicating a changing trend may be utilized as a weight when a period is calculated. The processor 120 may calculate the positioning communication period using "Equation 1*A".

If it is recognized that the distance is hardly changed or that the distance is not changed during a predetermined first period of time, the processor 120 may set A to a first weight value. If it is recognized that the distance tends to decrease, the processor 120 may set A to a second weight value, which is different from (e.g., lower than) the first weight value. If it is recognized that the distance tends to increase, the processor 120 may set A to a third weight value, which is different from the first weight value and the second weight value (e.g., larger than the first weight value).

If it is recognized that the distance tends to decrease at a walking speed, the processor 120 may set A to a fourth weight value. The fourth weight value may be equal to or less than the second weight value. If it is recognized that the distance tends to decrease at a running speed, the processor 120 may set A to a fifth weight value. The fifth weight value may be less than the fourth weight value. If it is recognized that the distance tends to increase at a walking speed, the processor 120 may set A to a sixth weight value. The sixth weight value may be equal to or greater than the third weight value. If it is recognized that the distance tends to increase at a running speed, the processor 120 may set A to a seventh weight value. The seventh weight value may be greater than the sixth weight value.

The processor 120 may set A differently depending on a calculated acceleration value. When the distance tends to decrease, the processor 120 may assign a smaller value to A as an acceleration value is higher. When the distance tends to increase, the processor 120 may assign a larger value to A as an acceleration value is higher.

A value (B) associated with a user's profile (e.g., age, height, or weight) and/or health information (e.g., heartbeat information, blood sugar information, or stress information) may be used as a weight. The processor 120 may calculate the positioning communication period using "Equation 1*A*B" or "Equation 1*B".

A value (C) associated with location information (e.g., global positioning system (GPS) information) obtained via the communication module 190 may be used as a weight. A period when the location of the electronic device 101 is a designated place (e.g., home) may be shorter than a period when the location is not a designated place (e.g., a mart). The processor 120 may calculate a positioning communication period using "Equation 1*A*B*C", "Equation 1*A*C", "Equation 1*B*C", or "Equation 1*C".

At step 350, the processor 120 may transmit a second positioning start message based on a changed period to the external electronic device 102 via a wireless communication channel. The processor 120 may transmit information associated with the changed period to the external electronic device 102 via the established wireless communication channel (e.g., a BLE or UWB communication channel) before performing step 350.

If it is recognized that the distance is not changed during a predetermined second period of time (longer than the first period of time) (e.g., if the direction or speed of the electronic device 101 is not changed), the processor 120 may deactivate positioning communication. The processor 120 may terminate a wireless communication channel (or session) with the external electronic device 102 for positioning communication. If it is recognized that the electronic device 101 moves in the state in which the positioning communication is deactivated, the processor 120 may resume positioning communication (performing step 300).

The processor 120 may control the strength of a signal to be transmitted via the wireless communication module 197 based on variation in the distance. If it is recognized that the distance between the electronic device 101 and the external electronic device 102 tends to decrease, the processor 120 may decrease the strength of a signal. If it is recognized that the distance tends to increase, the processor 120 may increase the strength of a signal.

Figure 4:
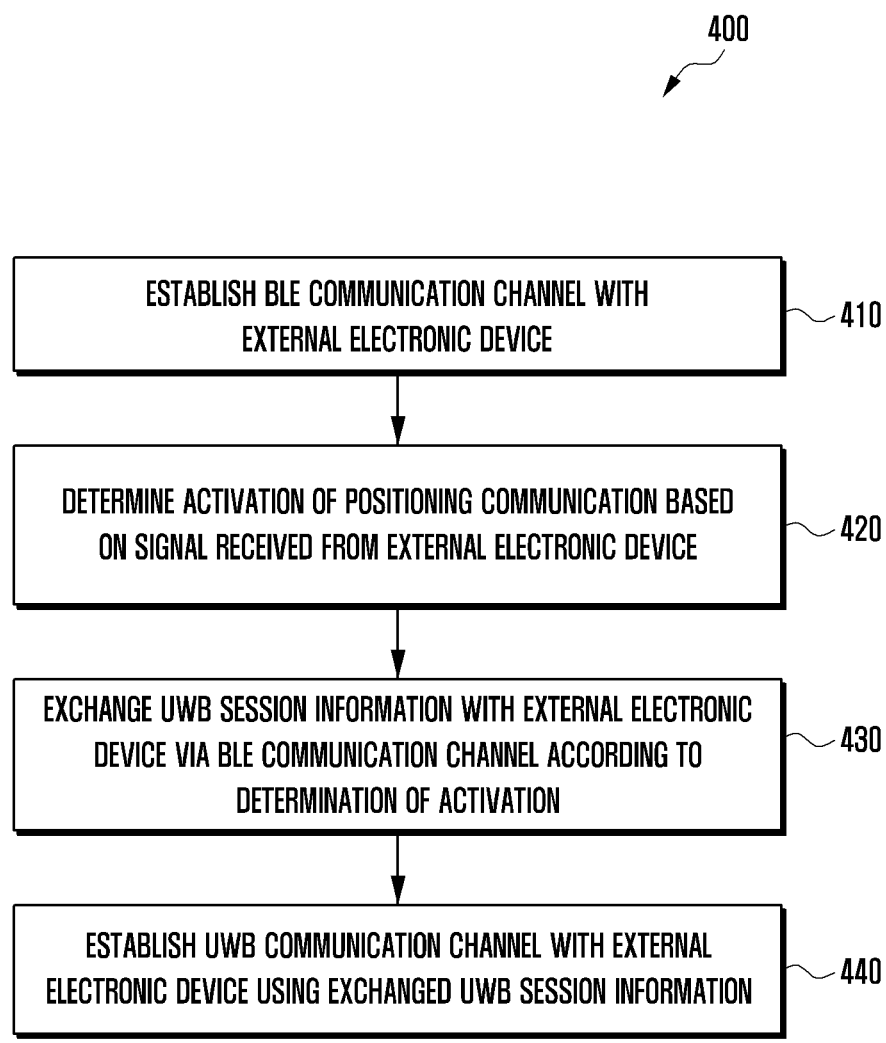
FIG. 4 is a flowchart of steps for establishing, by a processor, a wireless communication channel, according to an embodiment.

FIG. 4 is a flowchart 400 of steps for establishing, by the processor 120, a wireless communication channel, according to an embodiment.

The processor 120 may establish a BLE communication channel with the external electronic device 102 using the BLE communication circuit 210 at step 410.

At step 420, the processor 120 may determine to activate positioning communication using the UWB communication circuit 220 based on a signal received from the external electronic device 102 via the BLE communication channel. If the strength of the received signal exceeds a predetermined threshold value, the strength of the signal tends to increase, or the two conditions are satisfied, the processor 120 may determine to activate positioning communication.

At step 430, the processor 120 may exchange UWB session information (e.g., a wireless communication channel, a session ID, a data rate) required for establishing a UWB communication channel with the external electronic device 102 via the BLE communication channel, according to the determination. Additionally, at step 430, the processor 120 may transmit or receive information related to a positioning communication period with the external electronic device 102 via the BLE communication channel, and may determine the positioning communication period.

At step 440, the processor 120 may establish the UWB communication channel with the external electronic device 102 using the exchanged UWB session information.

Figure 5:
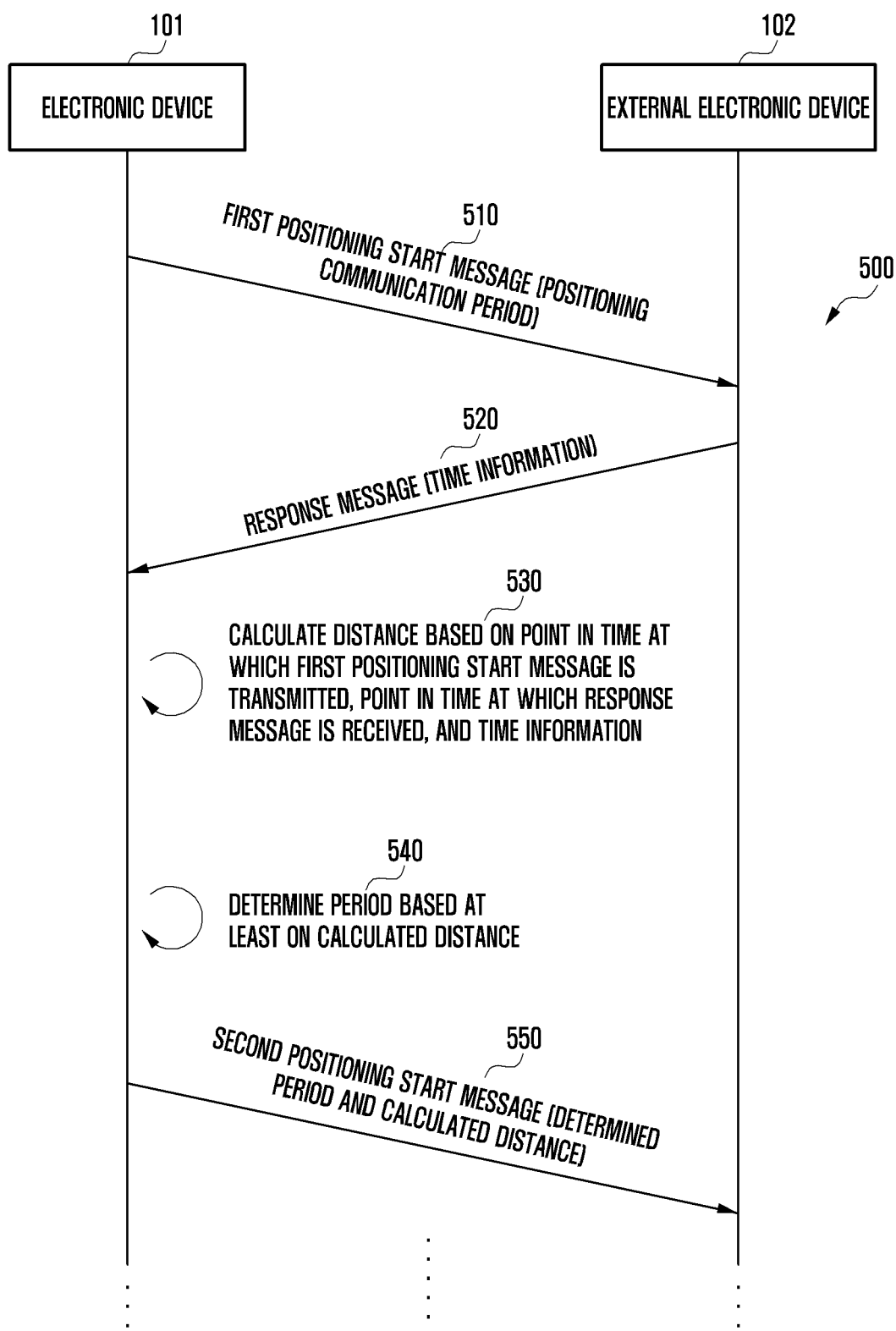
FIG. 5 is a diagram of steps for measuring, by a processor, a distance, according to an embodiment.

FIG. 5 is a diagram 500 of steps for measuring, by the processor 120, a distance using a single-side TWR (SS)-TWR, according to an embodiment.

At step 510, the processor 120 transmits a first positioning start message to the external electronic device 102 via a wireless communication channel (e.g., UWB communication channel) established using the wireless communication module 192 (e.g., the UWB communication circuit 220). The processor 120 may include information indicating a positioning communication period in the first positioning start message, and may transmit the same to the external electronic device 102. The information related to the period may be included in the payload of the first positioning start message, and may be transmitted.

At step 520, the processor 120 may receive a response message in response to the first positioning start message from the external electronic device 102 via the wireless communication channel using the wireless communication module 192. The external electronic device 102 may include time information (e.g., a time value) indicating the period of time that the external electronic device 102 spends processing the first positioning start message (e.g., generating a response message) in the response message, and may transmit the response message to the electronic device 101. The external electronic device 102 may operate in the sleep state during a predetermined period of sleep time (during a period of time corresponding to the positioning communication period) after transmitting the response message. In the sleep state, the external electronic device 102 may suspend an operation of receiving a signal from an electronic device 101 via a wireless communication module (e.g., a wireless communication circuit that supports wireless communication via the established wireless communication channel, for example, a UWB communication circuit). Also, during the sleep time after receiving the response message, the electronic device 101 may operate in the sleep state, in which the electronic device 101 does not transmit a signal to an external electronic device 102 via a wireless communication circuit (e.g., the UWB communication circuit 220) that supports wireless communication via the established wireless communication channel.

At step 530, the processor 120 may calculate the distance between the electronic device 101 and the external electronic device 102 based on the point in time at which the first positioning start message is transmitted, the point in time at which the response message is received, and the time information. The processor 120 may calculate a period of time spent on an event in which the first positioning start message is transmitted from the electronic device 101 and arrives at the external electronic device 102, based on the point in time at which the first positioning start message is transmitted, the point in time at which the response message is received, and the time information, and may obtain a distance by multiplying the calculated period of time by the speed of light.

At step 540, the processor 120 may determine (e.g., change or maintain) a positioning communication period based at least on the calculated distance (e.g., Equation (1) or a weight (at least one of A, B, and C of Table 1)).

At step 550, the processor 120 may transmit a second positioning start message, including information indicating the determined period and the calculated distance, to the external electronic device 102 via the established wireless communication channel, after the sleep time elapses.

The external electronic device 102 may calculate the distance between the electronic device 101 and the external electronic device 102 by performing the same step as steps 510, 520, and 530.

Figure 6:
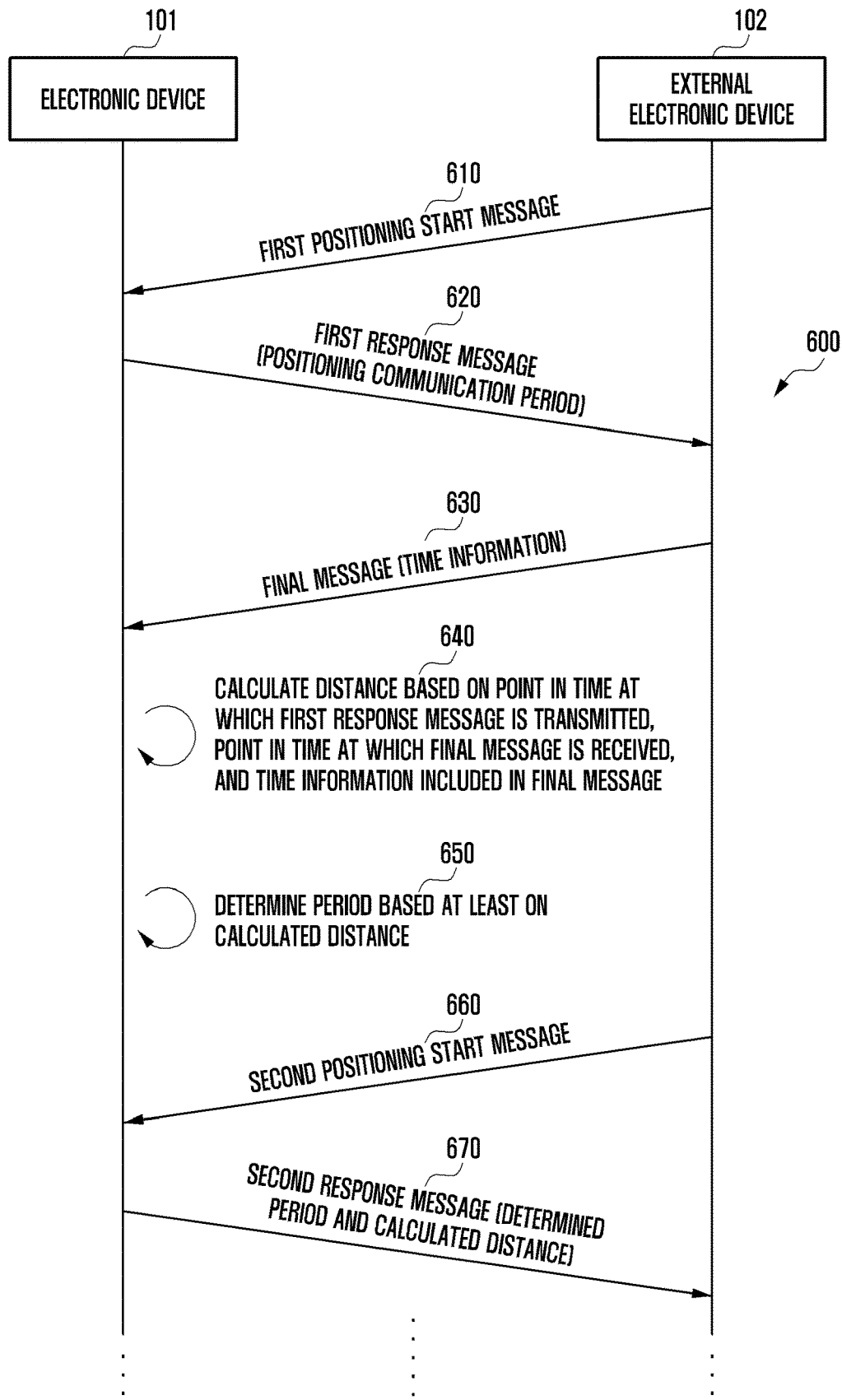
FIG. 6 is a diagram of steps for measuring, by a processor, a distance, according to an embodiment.

FIG. 6 is a diagram 600 of steps for measuring, by the processor 120, a distance using a DS-TWR, according to an embodiment.

At step 610, the processor 120 receives a first positioning start message from the external electronic device 102 via a wireless communication channel (e.g., UWB communication channel) established using the wireless communication module 192 (e.g., the UWB communication circuit 220). The processor 120 may determine to start positioning before step 610. The processor 120 may establish a wireless communication channel for positioning communication with the external electronic device 102, and may transmit a message indicating the start of positioning to the external electronic device 102. The external electronic device 102 may transmit the first positioning start message to the electronic device 101 in response to reception of the message.

At step 620, the processor 120 may transmit a first response message, including information indicating a positioning communication period, to the external electronic device 102 via the established wireless communication channel using the wireless communication module 192.

At step 630, the processor 120 may receive a final message of positioning communication from the external electronic device 102 via the established wireless communication channel using the wireless communication module 192. The external electronic device 102 may include time information (e.g., a time value) indicating the period of time that the external electronic device 102 spends processing the first response message (e.g., generating the final message) in the final message, and may transmit the final message to the electronic device 101. The external electronic device 102 may operate in the sleep state during a predetermined period of sleep time (during a period of time corresponding to the positioning communication period) after transmitting the final message. In the sleep state, the external electronic device 102 may suspend an operation of performing transmission or reception of a signal with an electronic device 101 via a wireless communication circuit that supports wireless communication via the established wireless communication channel. Also, during the sleep time after receiving the final message, the electronic device 101 may operate in the sleep state, in which the electronic device 101 does not perform transmission or reception of a signal with an external electronic device 102 via a wireless communication circuit (e.g., the UWB communication circuit 220) that supports wireless communication via the established wireless communication channel.

At step 640, the processor 120 may calculate the distance between the electronic device 101 and the external electronic device 102 based on the point in time at which the first response message is transmitted, the point in time at which the final message is received, and the time information. The processor 120 may calculate the period of time spent on an event in which the first response message is transmitted from the electronic device 101 and arrives at the external electronic device 102 based on the point in time at which the first response message is transmitted, the point in time at which the final message is received, and the time information, and may obtain a distance by multiplying the calculated period of time by the speed of light.

At step 650, the processor 120 may determine (e.g., change or maintain) a positioning communication period based at least on the calculated distance (e.g., Equation (1) or a weight (at least one of A, B, and C of Table 1)).

At step 660, the processor 120 may receive a second positioning start message from the external electronic device 102 using the wireless communication module 192 after the sleep time elapses.

At step 670, the processor 120 may transmit a second response message, including information indicating the determined period and the calculated distance, to the external electronic device 102 via the established wireless communication channel using the wireless communication module 192.

The external electronic device 102 may calculate the distance between the electronic device 101 and the external electronic device 102 by performing the same steps as steps 610, 620, 630, and 640.

FIG. 7A is a diagram of a dynamic change in a positioning communication period according to a changing trend of the distance between a user equipment 710 and a vehicle 720, according to an embodiment. FIG. 7B is a diagram of a dynamic change in a positioning communication period according to a changing trend of the distance between the user equipment 710 and the vehicle 720, according to an embodiment. FIG. 7C is a diagram of a dynamic change in a positioning communication period according to a changing trend of the distance between the user equipment 710 and the vehicle 720, according to an embodiment.

Referring to FIG. 7A, in the state in which the distance between the user equipment 710 (e.g., the electronic device 101 of FIG. 1) and the vehicle 720 (e.g., the external electronic device 102 of FIG. 1) tends to decrease, the user device 710 may move to the vehicle, and first positioning communication 733 may be performed between the user equipment 710 and the vehicle 720 based on a first period according to a first changing trend 731. Conversely, in the state in which the distance between the user equipment 710 and the vehicle 720 tends to increase, the user may move distant from the vehicle, and second positioning communication 743 may be performed between the user equipment 710 and the vehicle 720 based on a second period (a period longer than the first period) according to a second changing trend 741.

The user equipment 710 may calculate variation in the distance per unit time using a plurality of distance values obtained by performing periodic positioning communication with the vehicle 720. The user equipment 710 may recognize the first changing trend 731 or the second changing trend 741 based on the calculated variation. The user equipment 710 may set a positioning communication period to a first period or a second period based on the recognized changing trend, may inform the vehicle 720 of the set period, and may perform positioning communication with the vehicle 720 according to the set period. Additionally, the user equipment 710 may set the first period based on an acceleration value recognized using an acceleration sensor. As the acceleration value is higher, the user equipment 710 may set the first period to be shorter and may set the second period to be longer.

The vehicle 720 may calculate variation in the distance per unit time using a plurality of distance values obtained by performing periodic positioning communication with the user equipment 710. The vehicle 720 may recognize the first changing trend 731 or the second changing trend 741 based on the calculated variation. The vehicle 720 may set the positioning communication period to the first period or the second period based on the recognized changing trend, may inform the user equipment 710 of the set period, and may perform positioning communication with the vehicle 710 according to the set period. Additionally, the vehicle may recognize an acceleration when the distance between the electronic device 101 and the external electronic device 102 decreases or increases, based on the calculated variation. The vehicle 720 may set the first period based on the recognized acceleration value. As the acceleration value is higher, the vehicle 720 may set the first period to be shorter and may set the second period to be longer.

Referring to FIG. 7B, when the user equipment 710 stops moving in the state in which the first positioning communication 733 is performed by a first period, the positioning communication period may be changed to a third period (a period longer than the first period), and third positioning communication 753 may be performed between the user equipment 710 and the vehicle 720 by a third period. If the state of the user equipment 710, which stops moving, is maintained during a predetermined period of time, the positioning communication period may be changed to a fourth period (a period longer than the third period), or positioning communication may be suspended.

In the state in which the first positioning communication 733 is performed based on the first period, the user equipment 710 may recognize that there is no variation in the distance based on the calculated variation or recognized acceleration value. Accordingly, the user equipment 710 may set the positioning communication period to the third period, may inform the vehicle 720 of the set period, and may perform positioning communication with the vehicle 720 according to the set period. In the state in which the third positioning communication 753 is performed based on the third period, if it is recognized that there is no variation in the distance during a predetermined period of time, the user equipment 710 may change the positioning communication period to a fourth period (a period longer than the third period), or may suspend positioning communication.

In the state in which the first positioning communication 733 is performed based on the first period, the vehicle 720 may recognize that there is no variation in the distance based on the calculated variation. Accordingly, the vehicle 720 may set the positioning communication period to the third period, may inform the user equipment 710 of the set period, and may perform positioning communication with the user equipment 710 according to the set period. In the state in which the third positioning communication 753 is performed based on the third period, if it is recognized that there is no variation in the distance during a predetermined period of time, the vehicle 720 may change the positioning communication period to the fourth period (a period longer than the third period), or may suspend positioning communication.

Referring to FIG. 7C, when the user equipment 710 stops moving in the state in which the second positioning communication 743 is performed based on the second period, the positioning communication period may be changed to a fifth period (a period longer than the second period), and fourth positioning communication 763 may be performed between the user equipment 710 and the vehicle 720 based on the fifth period. If the state of the user equipment 710, which stops moving, is maintained during a predetermined period of time, the positioning communication period may be changed to a sixth period (a period longer than the fifth period), or positioning communication may be suspended or deactivated.

In the state in which the second positioning communication 743 is performed based on the second period, the user equipment 710 may set the positioning communication period to the fifth period based on the recognition of no variation in the distance, may inform the vehicle 720 of the set period, and may perform positioning communication with the vehicle 720 according to the set period. In the state in which the fourth positioning communication 763 is performed based on the fifth period, if it is recognized that there is no variation in the distance during a predetermined period of time, the user equipment 710 may change the positioning communication period to the sixth period (a period longer than the fifth period), or may suspend positioning communication.

In the state in which the second positioning communication 743 is performed based on the second period, the vehicle 720 may set the positioning communication period to the fifth period based on the recognition of no variation in the distance, may inform the user equipment 710 of the set period, and may perform positioning communication with the user equipment 710 according to the set period. In the state in which the fourth positioning communication 763 is performed based on the fifth period, if it is recognized that there is no variation in the distance during a predetermined period of time, the vehicle 720 may change the positioning communication period to the sixth period (a period longer than the fifth period), or may suspend positioning communication.

Figure 8:
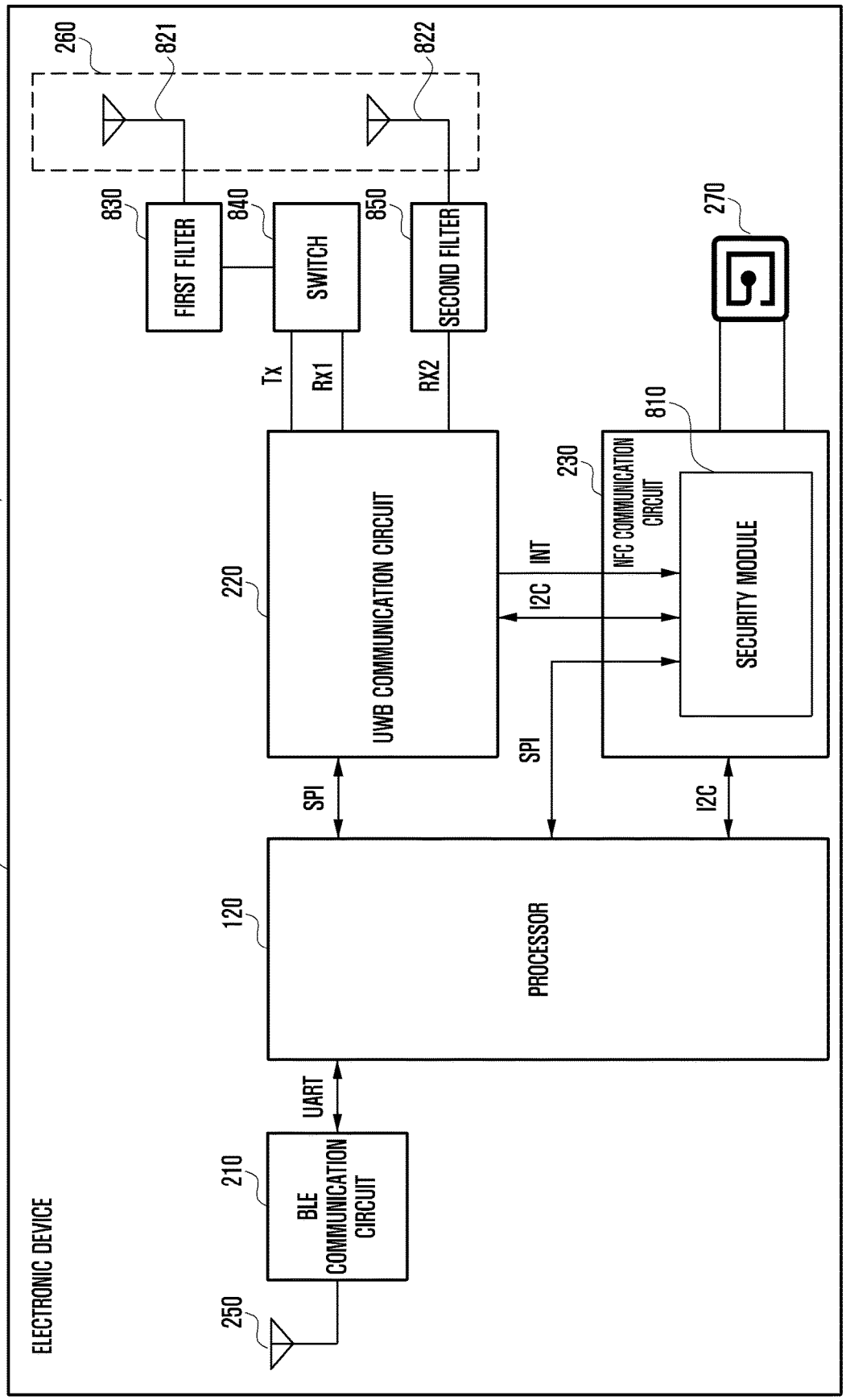
FIG. 8 is a diagram of a configuration of hardware of an electronic device that supports positioning communication, according to an embodiment.

FIG. 8 is a diagram of a configuration 800 of hardware of the electronic device 101 that supports positioning communication, according to an embodiment. Referring to FIG. 8, the processor 120 may be operatively connected to the BLE communication circuit 210, the UWB communication circuit 220, and the NFC communication circuit 230. The processor 120 may perform transmission or reception of a signal with the BLE communication circuit 210 via a universal asynchronous receiver/transmitter (UART) communication scheme. The processor 120 may perform transmission or reception of a signal with the UWB communication circuit 220 via an SPI communication scheme. The processor 120 may perform transmission or reception of a signal with the NFC communication circuit 230 via an inter integrated circuit (I2C) communication scheme. The processor 120 may perform transmission or reception of a signal with a security module 810 via an SPI communication scheme. The security module 810 (e.g., embedded secure element (eSE)) may perform transmission or reception of a signal with the UWB communication circuit 230 via the I2C communication scheme, and may receive a signal from the UWB communication circuit 230 via an interrupt (INT) pin. As illustrated in FIG. 8, the security module 810 may be implemented as a single module (e.g., software and/or hardware) in the NFC communication circuit 230.

The UWB communication circuit 220 may perform transmission or reception of a signal for measuring the distance with the external electronic device 102 via the UWB antenna 260. The UWB antenna 260 may include a first antenna 821 for RF signal transmission or reception and a second antenna 822 dedicated to RF signal reception. The first antenna 821 may be connected to the switch 840 via a first filter 830 (e.g., a UWB band pass filter). The switch 840 may selectively connect the first filter 830 to a transmission line (Tx) or a first reception line (Rx1) connected to the UWB communication circuit 220. The second antenna 822 may be connected to a second reception line (Rx2), which is connected to the UWB communication circuit 220, via a second filter 850 (e.g., a UWB band pass filter). The UWB communication circuit 220 may receive information (e.g., a positioning start message) to be transferred to the external electronic device 102 from the processor 120, and may transmit the received information to the external electronic device 102 using the first antenna 821. The UWB communication circuit 220 may receive information (e.g., a response message) from the external electronic device 102 using the first antenna 821 or the second antenna 822, and may transfer the received information to the processor 120.

The processor 120 may exchange a message to be transmitted to or received from the external electronic device 102 with the UWB communication circuit 220 via the security module 810. The security module 810 may receive, from the processor 120, an encryption key request for information (e.g., user authentication information, payment information, or a vehicle door lock command (or unlock command)) to be transferred to the external electronic device 102 and generate an encryption key corresponding to the received information using an encryption key value stored in the security module 810, and may transfer the encryption key to the UWB communication circuit 220. The UWB communication circuit 220 may transmit the encryption key to the external electronic device 102 using the first antenna 821. The security module 810 may receive, from the UWB communication circuit 220, the encryption key corresponding to the information to be transferred to the processor 120, may decode the encryption key, and may transfer the same to the processor 120.

Figure 9:
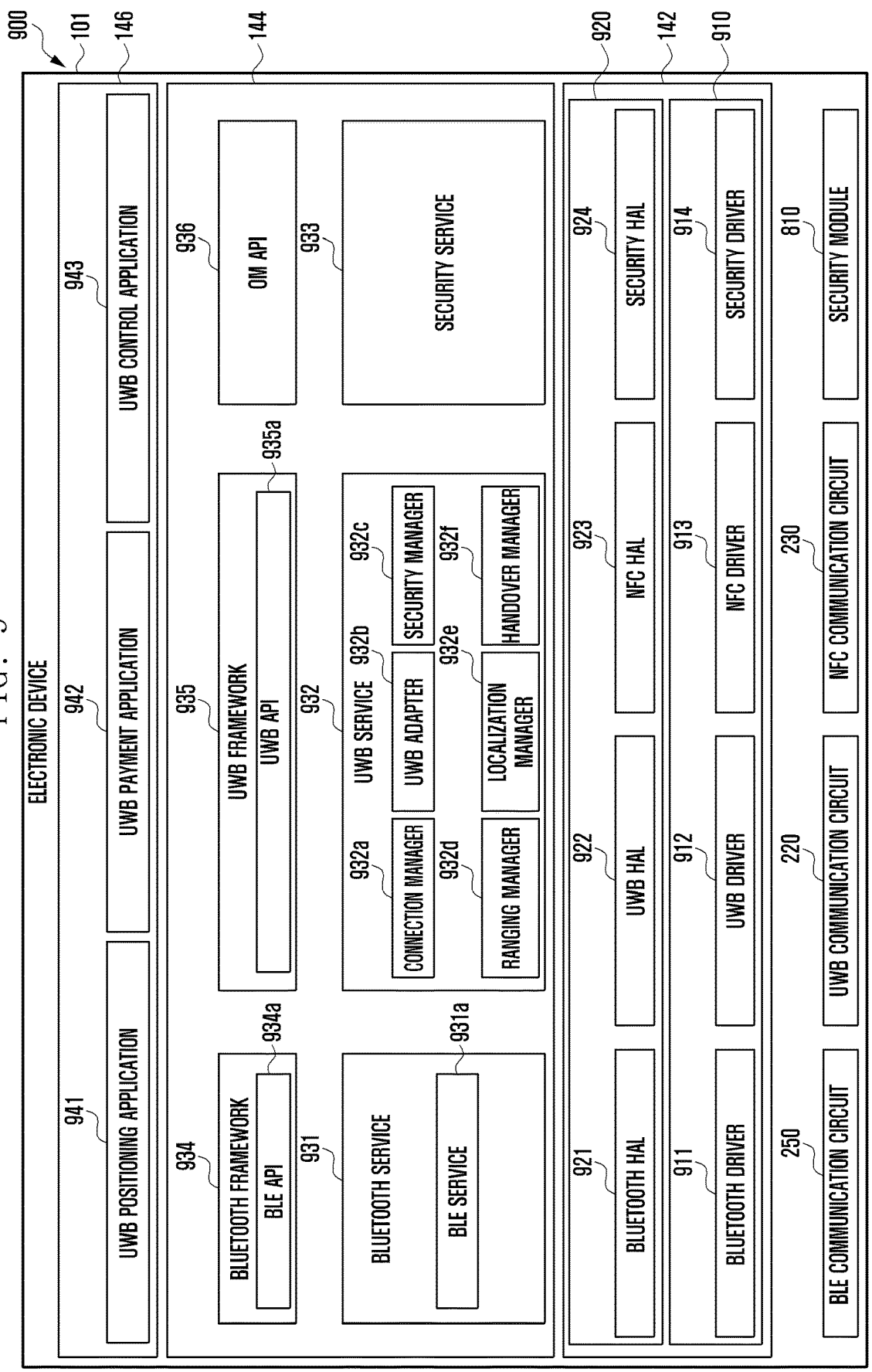
FIG. 9 is a diagram of a configuration of software and hardware of an electronic device that supports positioning communication according to various embodiments.

FIG. 9 is a diagram of a configuration 900 of software and hardware of the electronic device 101 that supports positioning communication, according to an embodiment. Referring to FIG. 9, the operating system 142, the middleware 144, and the applications 146 may control the BLE communication circuit 210, the UWB communication circuit 220, the NFC communication circuit 230, or the security module 810, and may support a function related to positioning communication and/or a service based on positioning communication.

The operating system 142 may control management (e.g., allocation or collection) of one or more system resources (e.g., a process, a memory, or a power source) of the electronic device 101. The operating system 142 may include a driver 910 and a hardware abstraction layer (HAL) 920. The driver 910 may include a Bluetooth driver 911 for driving the BLE communication circuit 210, a UWB driver 912 for driving the UWB communication circuit 220, an NFC driver 913 for driving the NFC communication circuit 230, or a security driver (e.g., eSE SPI driver) for driving the security module 810. The HAL 920 may include a Bluetooth HAL 921, a UWB HAL 922, an NFC HAL 923, or a security HAL 924 (e.g., eSE SPI HAL).

The middleware 144 may provide various functions to the applications 146 so that functions or information provided from one or more resources of the electronic device 101 are used by the applications 146. The middleware 144 may include a Bluetooth service 931, a UWB service 932, a security service 933, a Bluetooth framework 934, a UWB framework 935, or an open mobile application programming interface (OMAPI) 936. The Bluetooth service 931 may include a BLE service 931*a*. The UWB service 932 may include a connection manager 932*a* that manages connection to an external electronic device (e.g., the external electronic device 102 of FIG. 1), a UWB adapter 932*b*, a security manager 932*c*, a distance measurement manager (ranging manager) 932*d*, a positioning manager (localization manager) 932*e*, and a handover manager 932*f* configured to hand over a given function (e.g., distance measurement) to another communication scheme (e.g., BLE). The Bluetooth framework 934 may include an open BLE API 934*a*. The UWB framework 935 may include an open UWB API 935*a*.

The applications 146 may include a UWB positioning application 941 that supports measuring a distance and positioning using a UWB, a UWB payment application 942 that supports making a payment or paying royalty using a UWB, and a UWB control application 943 that supports control (e.g., locking or unlocking a door) of an external electronic device (e.g., a vehicle) using a UWB.

Figure 10:
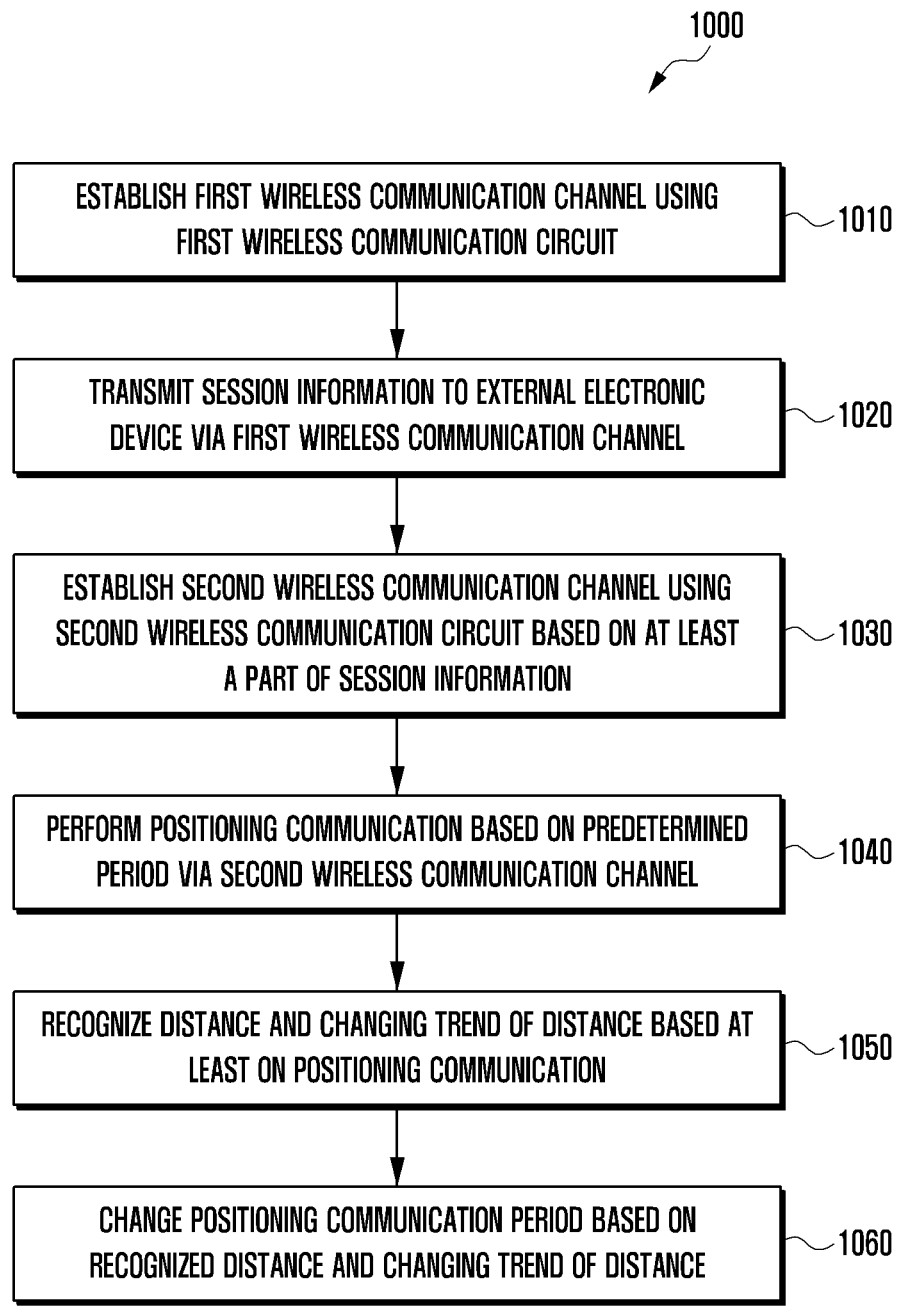
FIG. 10 is a flowchart of steps for positioning by a processor, according to an embodiment.

FIG. 10 is a flowchart 1000 of steps for positioning by the processor 120, according to an embodiment.

At step 1010, the processor 120 of the electronic device 101 may establish a first wireless communication channel with an external electronic device 102 using a first wireless communication circuit (e.g., the BLE communication circuit 210 of FIG. 2).

At step 1020, the processor 120 may transmit session information (e.g., information associated with a UWB communication channel, a session ID, a data rate, a positioning communication period, a SS TWR, or a DS TWR) to the external electronic device via the first wireless communication channel.

At step 1030, the processor 120 may establish a second wireless communication channel with the external electronic device using a second wireless communication circuit (e.g., the UWB communication circuit 220), based on at least a part of the session information.

At step 1040, the processor 120 may perform positioning communication with the external electronic device (e.g., steps 510 and 520 of FIG. 5 or steps 610, 620, and 630 of FIG. 6) based on a predetermined period via the second wireless communication channel.

A step 1050, the processor 120 may recognize the distance between the electronic device 101 and the external electronic device and a changing trend of the distance based at least on the positioning communication.

At step 1060, the processor 120 may change the positioning communication period based on the recognized distance and/or the changing trend.

Figure 11:
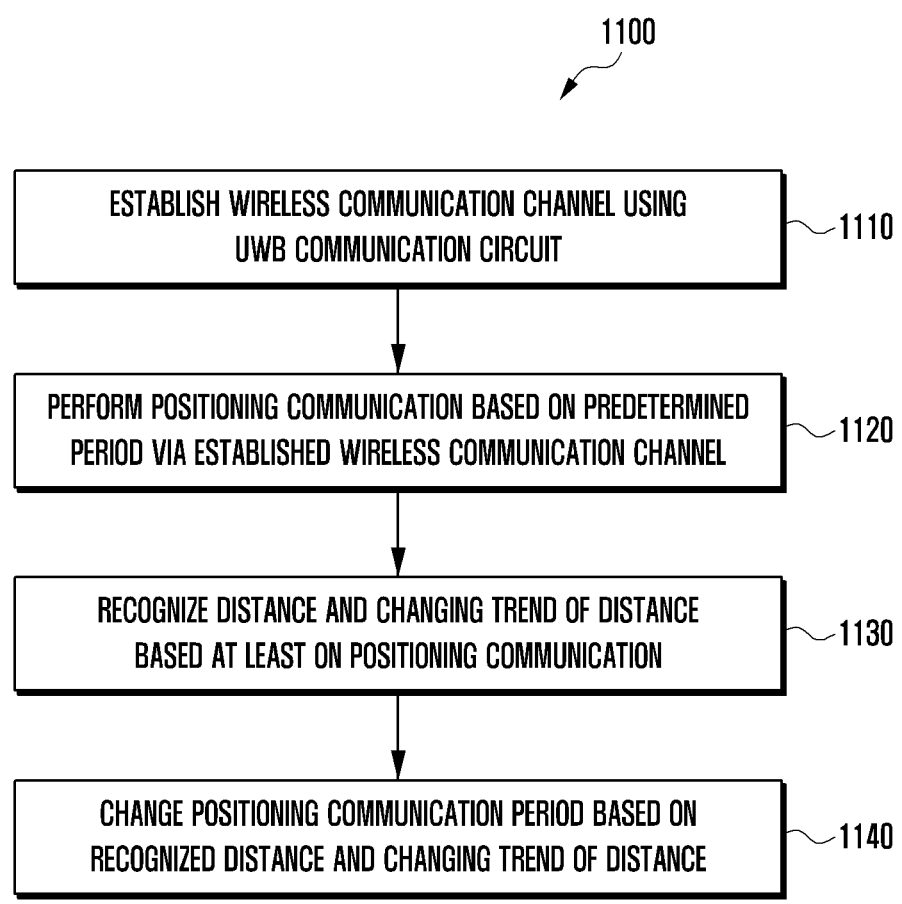
FIG. 11 is a flowchart of steps for positioning by a processor, according to an embodiment.

FIG. 11 is a flowchart 1100 of steps for positioning by the processor 120, according to an embodiment.

At step 1110, the processor 120 of the electronic device 101 may establish a wireless communication channel with an external electronic device 102 using a UWB communication circuit 220.

At step 1120, the processor 120 may perform positioning communication with the external electronic device (e.g., steps 510 and 520 of FIG. 5 or steps 610, 620, and 630 of FIG. 6) based on a predetermined first period via the established wireless communication channel.

At step 1130, the processor 120 may recognize the distance between the electronic device 101 and the external electronic device and a changing trend of the distance based at least on the positioning communication.

At step 1140, the processor 120 may change the positioning communication period based on the recognized distance and/or the changing trend.

According to an embodiment, an electronic device may include a first wireless communication circuit, a second wireless communication circuit which uses a communication scheme different from the first wireless communication circuit, a processor operatively connected to the first wireless communication circuit and the second wireless communication circuit, and a memory operatively connected to the processor. The memory stores instructions, and when the instructions are executed, the instructions cause the processor to establish a first wireless communication channel with an external electronic device using the first wireless communication circuit, transmit session information to the external electronic device via the first wireless communication channel, establish a second wireless communication channel with the external electronic device using the second wireless communication circuit, based on at least a part of the session information, perform positioning communication with the external electronic device based on a predetermined first period via the second wireless communication channel, recognize a distance between the electronic device and the external electronic device and a changing trend of the distance based at least on the positioning communication, and change the positioning communication period based on the recognized distance and changing trend.

The instructions, when executed, may cause the processor to determine the strength of a signal received from the external electronic device via the BLE communication circuit or variation in the strength, determine to activate positioning communication, based on a result of the determination, and establish the wireless communication channel for positioning communication using the UWB communication circuit, according to the result.

The instructions, when executed, may further cause the processor to calculate variation in the distance per unit time using a plurality of distance values obtained by performing periodic positioning communication, if it is recognized that the distance between the electronic device and the external electronic device is not changed, or if the distance is not changed during a predetermined period of time based on the calculated variation, set the positioning communication period to a second period, which is longer than the first period, if it is recognized that the distance between the electronic device and the external electronic device tends to decrease based on the calculated variation, set the positioning communication period to a third period, which is shorter than the first period, and if it is recognized that the distance between the electronic device and the external electronic device tends to increase based on the calculated variation, set the positioning communication period to a fourth period, which is longer than the first period.

The electronic device may further include an acceleration sensor operatively connected to the processor, where the instructions, when executed, may further cause the processor to determine variation in an acceleration value based on information periodically received from the acceleration sensor, set the third period to be shorter as the acceleration value is higher when the distance between the electronic device and the external electronic device decreases, and set the fourth period to be longer as the acceleration value is higher and the distance between the electronic device and the external electronic device increases.

The instructions, when executed, may further cause the processor to position communication, by transmitting a positioning start message including the first period to the external electronic device and receiving a response message in response to the positioning start message from the external electronic device and recognize the distance between the electronic device and the external electronic device using the point in time at which the positioning start message is transmitted, the point in time at which the response message is received, and time information included in the response message. The information associated with the recognized distance may be included in a positioning start message to be transmitted subsequently, and may be transmitted to the external electronic device. The information associated with the changed period may be included in a positioning start message to be transmitted subsequently, and may be transmitted to the external electronic device.

The instructions, when executed, may further cause the processor to position communication by receiving a positioning start message from the external electronic device, transmitting a response message including the first period to the external electronic device, and receiving a final message including time information from the external electronic device as a response of the external electronic device that receives the response message, and recognize the distance between the electronic device and the external electronic device using the point in time at which the response message is transmitted, the point in time at which the final message is received, and time information included in the final message. The information associated with the recognized distance may be included in a response message to be transmitted subsequently, and may be transmitted to the external electronic device. The information associated with the changed period may be included in a response start message to be transmitted subsequently, and may be transmitted to the external electronic device.

When the recognized distance is within a threshold value, when user input that the processor receives via an input device is user input for controlling the external electronic device, or when an application running in the electronic device is a designated application, the instructions may cause the processor to further calculate a variation in the distance per unit time using a plurality of distance values obtained by performing periodic positioning communication and to recognize that the distance between the electronic device and the external electronic device tends to decrease or recognize that the distance between the electronic device and the external electronic device tends to increase based on the calculated variation in the distance so as to recognize a changing trend. The electronic device may further include an acceleration sensor operatively connected to the processor, where the instructions, when executed, may further cause the processor to calculate an acceleration of the electronic device using a signal received from the acceleration sensor when the distance between the electronic device and the external electronic device decreases or increases, so as to recognize the changing trend. The running application may include an application of which an execution screen is displayed on a display.

The instructions, when executed, may further cause the processor to calculate variation in the distance per unit time using a plurality of distance values obtained by performing periodic positioning communication, and, if it is recognized that the distance between the electronic device and the external electronic device is not changed during a predetermined period of time, based on the calculated variation, deactivate the positioning communication. The instructions may further cause the processor to terminate the wireless communication channel so as to deactivate the positioning communication.

According to an embodiment, an electronic device may include a UWB communication circuit, a processor operatively connected to the UWB communication circuit, and a memory operatively connected to the processor. The memory stores instructions, and when the instructions are executed, the instructions, when executed, further cause the processor to establish a wireless communication channel with an external electronic device using the UWB communication circuit, perform positioning communication with the external electronic device based on a predetermined period, via the wireless communication channel, recognize a distance between the electronic device and the external electronic device, and a changing trend of the distance, based at least on the positioning communication, and change the positioning communication period based on the recognized distance and the changing trend.

The term "module" used herein may represent, for example, a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. For example, the "module" may include an ASIC.

Various embodiments of the present disclosure may be implemented by software including an instruction stored in a machine-readable storage media readable by a machine (e.g., a computer). The machine may be a device that calls the instruction from the machine-readable storage media and operates depending on the called instruction and may include the electronic device. When the instruction is executed by the processor, the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

According to an embodiment, the method may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components may be integrated in one component and may perform the same or similar functions performed by each corresponding components prior to the integration. Operations performed by a module, a programming, or other components according to various embodiments of the present disclosure may be executed sequentially, in parallel, repeatedly, or in a heuristic method. Also, at least some operations may be executed in different sequences, omitted, or other operations may be added.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof

What is claimed is:

1. An electronic device, comprising:
    a first wireless communication circuit;
    a second wireless communication circuit which uses a communication scheme different from the first wireless communication circuit;
    a processor operatively connected to the first wireless communication circuit and the second wireless communication circuit; and
    a memory operatively connected to the processor,
    wherein the memory stores instructions, and when the instructions are executed, the instructions cause the processor to:
    establish a first wireless communication channel with an external electronic device using the first wireless communication circuit;
    transmit session information to the external electronic device via the first wireless communication channel;
    establish a second wireless communication channel with the external electronic device using the second wireless communication circuit, based on at least a part of the session information;
    perform positioning communication with the external electronic device based on a predetermined first period via the second wireless communication channel;

recognize a distance between the electronic device and the external electronic device and a changing trend of the distance based at least on the positioning communication; and change a positioning communication period based on the recognized distance and changing trend.

2. The electronic device of claim 1, wherein the first wireless communication circuit is a Bluetooth Low Energy (BLE) communication circuit and the second wireless communication circuit is an ultra-wideband (UWB) communication circuit.

3. The electronic device of claim 2, wherein the instructions, when executed, further cause the processor to:
determine a strength of a signal received from the external electronic device via the BLE communication circuit or a variation in the strength;
determine to activate positioning communication based on the determination result; and
establish a wireless communication channel for positioning communication using the UWB communication circuit, according to the determination.

4. The electronic device of claim 1, wherein the instructions, when executed, further cause the processor to:
calculate a variation in the distance per unit time using a plurality of distance values obtained by performing periodic positioning communication;
if it is recognized that the distance between the electronic device and the external electronic device is not changed, or if the distance is not changed during a predetermined period of time, based on the calculated variation, set the positioning communication period to a second period, which is longer than the predetermined first period;
if it is recognized that the distance between the electronic device and the external electronic device tends to decrease based on the calculated variation, set the positioning communication period to a third period, which is shorter than the predetermined first period; and
if it is recognized that the distance between the electronic device and the external electronic device tends to increase based on the calculated variation, set the positioning communication period to a fourth period, which is longer than the predetermined first period.

5. The electronic device of claim 4, further comprising:
an acceleration sensor operatively connected to the processor,
wherein the instructions, when executed, further cause the processor to:
determine a variation in an acceleration value based on information periodically received from the acceleration sensor;
set the third period to be shorter as the acceleration value is higher when the distance between the electronic device and the external electronic device decreases; and
set the fourth period to be longer as the acceleration value is higher and the distance between the electronic device and the external electronic device increases.

6. The electronic device of claim 1, wherein the instructions, when executed, further cause the processor to:
position communication by transmitting a positioning start message including the predetermined first period to the external electronic device and receiving a response message in response to the positioning start message from the external electronic device; and
recognize the distance between the electronic device and the external electronic device using a point in time at which the positioning start message is transmitted, a point in time at which the response message is received, and time information included in the response message.

7. The electronic device of claim 6, wherein information associated with the recognized distance is included in a positioning start message to be transmitted subsequently, and is transmitted to the external electronic device.

8. The electronic device of claim 6, wherein information associated with the changed positioning communication period is included in a positioning start message to be transmitted subsequently, and is transmitted to the external electronic device.

9. The electronic device of claim 1, wherein the instructions, when executed, further cause the processor to:
position communication by receiving a positioning start message from the external electronic device, transmitting a response message including the predetermined first period to the external electronic device, and receiving a final message including time information from the external electronic device as a response of the external electronic device that receives the response message; and
recognize the distance between the electronic device and the external electronic device using a point in time at which the response message is transmitted, a point in time at which the final message is received, and time information included in the final message.

10. The electronic device of claim 9, wherein the information associated with the recognized distance is included in a response message to be transmitted subsequently and is transmitted to the external electronic device.

11. The electronic device of claim 9, wherein the information associated with the changed period is included in a response start message to be transmitted subsequently, and is transmitted to the external electronic device.

12. The electronic device of claim 1, wherein, when the recognized distance is within a threshold value, when a user input that the processor receives via an input device is a user input for controlling the external electronic device, or when an application running in the electronic device is a designated application, the instructions, when executed, further cause the processor to:
calculate a variation in the distance per unit time using a plurality of distance values obtained by performing periodic positioning communication, and recognizing that the distance between the electronic device and the external electronic device tends to decrease or recognizing that the distance between the electronic device and the external electronic device tends to increase, based on the calculated variation in the distance, so as to recognize the changing trend.

13. The electronic device of claim 12, further comprising:
an acceleration sensor operatively connected to the processor,
wherein the instructions, when executed, further cause the processor to calculate an acceleration of the electronic device using a signal received from the acceleration sensor when the distance between the electronic device and the external electronic device decreases or increases, so as to recognize the changing trend.

14. The electronic device of claim 12, wherein the running application comprises an application of which an execution screen is displayed on a display.

15. The electronic device of claim 1, wherein the instructions, when executed, further cause the processor to:

calculate a variation in the distance per unit time using a plurality of distance values obtained by performing periodic positioning communication; and if it is recognized that the distance between the electronic device and the external electronic device is not changed during a predetermined period of time, based on the calculated variation, deactivate the positioning communication.

16. The electronic device of claim 15, wherein the instructions, when executed, further cause the processor to terminate the second wireless communication channel so as to deactivate the positioning communication.

17. A method of operating an electronic device, the method comprising:
    establishing a first wireless communication channel with an external electronic device using a first wireless communication circuit of the electronic device;
    transmitting session information to the external electronic device via the first wireless communication channel;
    establishing a second wireless communication channel with the external electronic device using a second wireless communication circuit of the electronic device based on at least a part of the session information;
    performing positioning communication with the external electronic device based on a predetermined first period via the second wireless communication channel;
    recognizing a distance between the electronic device and the external electronic device and a changing trend of the distance, based at least on the positioning communication; and
    changing a positioning communication period, based on the recognized distance and the changing trend.

18. The method of claim 17, wherein the first wireless communication circuit is a Bluetooth Low Energy (BLE) communication circuit and the second wireless communication circuit is a UWB communication circuit.

19. The method of claim 17, wherein recognizing the changing trend comprises calculating a variation in the distance per unit time using a plurality of distance values obtained by performing periodic positioning communication, wherein changing the positioning communication period comprises:

if it is recognized that the distance between the electronic device and the external electronic device is not changed or if the distance is not changed during a predetermined period of time, based on the calculated variation, setting the positioning communication period to a second period, which is longer than the predetermined first period; and if it is recognized that the distance between the electronic device and the external electronic device tends to decrease, based on the calculated variation, setting the positioning communication period to a third period, which is shorter than the predetermined first period; and if it is recognized that the distance between the electronic device and the external electronic device tends to increase, based on the calculated variation, setting the positioning communication period to a fourth period, which is longer than the predetermined first period.

* * * * *